United States Patent [19]

Asato

[11] Patent Number: 5,473,328
[45] Date of Patent: Dec. 5, 1995

[54] METHOD AND APPARATUS FOR TRANSMITTING DIGITAL DATA

[75] Inventor: Yoichiro Asato, Kanagawa, Japan

[73] Assignee: Sony Corporation, Tokyo, Japan

[21] Appl. No.: 149,239

[22] Filed: Nov. 9, 1993

[30] Foreign Application Priority Data

Nov. 13, 1992 [JP] Japan .................................. 4-303844

[51] Int. Cl.⁶ .................................................. H03M 7/00
[52] U.S. Cl. .............................. 341/55; 371/57.1; 360/48
[58] Field of Search ..................... 341/50, 55; 371/57.1; 360/47, 48

[56] References Cited

U.S. PATENT DOCUMENTS 3,976,972  8/1976  Aman ........................................ 371/57.1
4,962,509  10/1990  Itoh ............................................ 375/17
4,977,559  12/1990  McCambridge ........................ 371/57.1

*Primary Examiner*—Marc S. Hoff
*Attorney, Agent, or Firm*—Jay H. Maioli

[57] ABSTRACT

A transmission method for transmitting data containing inhibition code data that cannot be recorded in a digital recording and/or reproducing apparatus. The method includes a step of converting the inhibition code data into special code data and ID code data having redundancy and not containing the inhibition code data, a step of converting the special code data into two special code data and one special code data and a step of directly outputting data other than the inhibition code data and the special code data. The method enables transmission of the totality of coded data inclusive of the inhibition code data that cannot be recorded.

8 Claims, 9 Drawing Sheets

METHOD AND APPARATUS FOR TRANSMITTING DIGITAL DATA

BACKGROUND OF THE INVENTION

This invention relates to a method and device for transmitting digital data containing unusable inhibition code data.

In one aspect of transmission of digital data, there are occasions wherein input digital data are recorded and/or reproduced for transmission. In such transmission, code data which is not proper to be recorded during recording and/or reproduction, that is, inhibition code data as later described, cannot be transmitted, so that the inhibition code data are replaced by code data other than the inhibition code data prior to transmission.

That is, for recording/reproducing digital data, since it may occur that certain data portions are unable to be reproduced due to error occurrence during recording/playback, the conventional practice has been to replace during playback the data portion suffering from the error occurrence by particular code data indicating that the data portion is error data. Consequently, if the code data which are the same as the particular code data are supplied as an input and the code data which are the same as the particular code data are recorded or reproduced, it becomes impossible to decipher whether the reproduced data is the particular code data indicating an error or the input data having the same contents as the particular code data. Therefore, if the code data having the same contents as the particular code data is supplied as input data, it is necessary to render the code data unrecordable as being inhibition data.

For this reason, the conventional practice has been to record and/or reproduce input digital data for transmission after replacing the inhibition code data in the input digital data which is not to be recorded for recording/reproduction by code data which is not the inhibition code data.

There are also occasions wherein the totality of code data inclusive of the inhibition code data has to be transmitted for transmission of the digital data. However, since the conventional practice when the inhibition code data is supplied as input data has been to convert the inhibition code data simply into code data other than the inhibition code data to transmit the converted inhibition code data, the inhibition data supplied as input data becomes unable to be transmitted even in cases wherein it is necessary to transmit the totality of code data inclusive of the inhibition code data.

Consequently, if, in a system for recording/reproducing the digital data for transmission, the totality of code data inclusive of the inhibition code data are desired to be used for the purpose of recording and/or playback, such as for a data recorder, the above-described method of simply converting the inhibition code data cannot be employed.

OBJECT AND SUMMARY OF THE INVENTION

In view of the above-described status of the art, it is an object of the present invention to provide a transmission method and device whereby the input digital data may be transmitted even in cases wherein the inhibition code data are contained in the input data.

The present invention provides a transmission method for transmitting data containing inhibition code data that cannot be recorded in a digital recording and/or reproducing apparatus, comprising a conversion rule for converting at least the inhibition code into code data having a redundancy and not containing the inhibition code data, and an inverse conversion rule for performing an inverse conversion which is the reverse of the conversion rule.

Specifically, the conversion rule is such a rule in which the inhibition code data is converted into special code data which is not the inhibition code data and ID code data which is not the special code data nor the inhibition code data, while the special code data is converted into code data consisting of a special code data and a special code data, that is, two consecutive special code data, and the code data which is not the inhibition code data nor the special code data is transmitted directly, that is, without any conversion. On the other hand, the inverse conversion rule which is a counterpart of the above-mentioned conversion rule is such a rule in which code data consisting of special code data and ID code data is inverse-converted into the inhibition code data, while code data consisting of two consecutive special code data is inverse-converted into the special code data and code data other than these are transmitted directly, that is, without any inverse conversion.

The redundancy may be set so as to be less than twice the byte volume of the code data. The redundant portion is set so as not to be coincident with any portion of the inhibition code data and is set so as to be a portion of the next following data.

The present invention also provides a transmission device for transmitting data containing inhibition code data that cannot be recorded in a digital recording and/or reproducing apparatus, comprising converting means for converting at least the inhibition code data into code data consisting of a special code data which is not the inhibition code data and an ID code data which is not the inhibition code data nor the special code data, that is, for converting the inhibition code into code data having a redundancy and not containing the inhibition code data, and inverse converting means for performing inverse conversion which is a counterpart operation of the conversion performed by the converting means.

The special code data and the ID code data are based on a byte in conformity to at least the inhibition code data. That is, the code data after conversion by the conversion means has the redundancy with respect to the code data to be converted, that is, the redundancy equal to twice, thrice or more the original data volume.

Specifically, in the converting means of the transmission device of the present invention, the inhibition code data is converted into special code data which is not the inhibition code data and ID code data which is not the special code data nor the inhibition code data, while the special code data is converted into code data consisting of a special code data and a special code data, that is two consecutive special code data, and the code data which is not the inhibition code data nor the special code data is transmitted directly, that is, without any conversion. In the inverse conversion means, the code data consisting of special code data and ID code data is inverse-converted into the inhibition code data, while code data consisting of two consecutive special code data is inverse-converted into the special code data and code data other than these are transmitted directly, that is, without any inverse conversion.

If the distribution of the input code data occurrence frequency is not uniform, it is desirable to select the code data having a low frequency in terms of the distribution of the occurrence frequency of the input code data.

In the conversion means, the ID code data may be set so as to be less than twice the byte volume of the special code data. In such case, the ID code data is set so as not to be coincident with any portion of the inhibition code data, and the conversion means causes the ID code data to be a portion of the next following data.

That is, the input digital data containing the inhibition code data is converted into a code data string free of the inhibition code data and the code data string free of the inhibition code data is inverse-converted into the input digital data containing the inhibition code data can be considered as a pre-processing form and a post-processing form, respectively, for e.g. a digital recording apparatus, such as a digital video tape recorder (VTR), in which certain code data are set as the inhibition code in such a manner that the totality of code data inclusive of the inhibition code data may be recorded and/or reproduced. The code data string herein means the code data having a redundancy on the order of 1 to several times that of the original code data string.

In converting the original code data into the above-mentioned code data, the redundancy is set so as to be less than twice the original data volume to suppress the increase in the data volume by conversion. For example, if the minimum recording unit in the recording apparatus is 1 byte to 8 bits, the 1-byte data is converted into the 1 byte to which is added 2 bits.

The redundant portion becomes a part of the next following data. The redundant portion is selected so as not to be coincident with any portion of the inhibition code string to prevent the continuity of inhibition code data as well as to suppress the increase in the data volume by conversion.

DETAILED DESCRIPTION OF THE PREFERRED EMBODIMENTS

The transmission method for transmitting digital data according to the present invention is a method for transmitting digital data containing inhibition code data which can not be recorded by a digital data recording and/or reproducing apparatus. The method includes a conversion rule for converting the inhibition code into code data having a redundancy and not containing the inhibition code data, and an inverse conversion rule for performing an inverse conversion which is the reverse of the conversion rule. Specifically, the conversion rule is such a rule in which the inhibition code data is converted into special code data which is not the inhibition code data and ID code data which is not the special code data nor the inhibition code data, while the special code data is converted into code data consisting of a special code data and a special code data, that is, two consecutive special code data, and the code data which is not the inhibition code data nor the special code data is transmitted directly, that is, without any conversion. The inverse conversion rule, which is a counterpart of the above-mentioned conversion rule, is such a rule in which code data consisting of special code data and ID code data is inverse-converted in the inhibition code data, while code data consisting of two consecutive special code data is inverse-converted into the special code data and code data other than these are transmitted directly, that is, without any inverse conversion.

Figure 1:
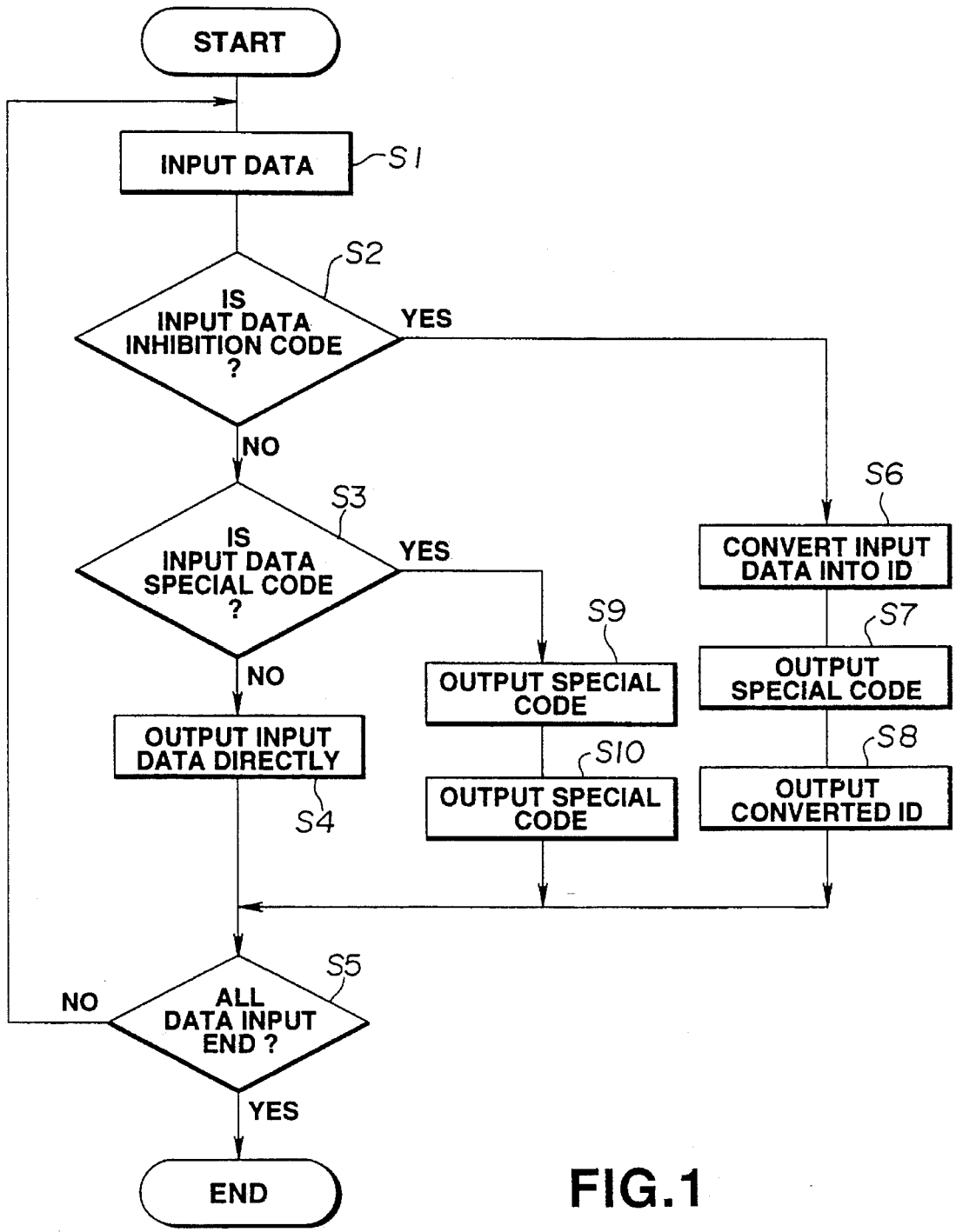
FIG. 1 is a flow chart for illustrating the method for transmitting digital data according to the present invention.

The conversion rule in the transmission method according to the present invention is implemented by the process as shown in the flow chart shown in FIG. 1.

If data is entered at step S1 in FIG. 1, it is checked at step S2 to determine whether or not the input data is an inhibition code data. If the result of checking at step S2 is YES, that is, if the input data is found to be the inhibition code data, control proceeds to step S6. If the result of checking at step S2 is NO, that is, if the input data is found not to be the inhibition code data, control proceeds to step S3.

At step S3, it is checked whether or not the input data is the special code data, If the result of checking is YES, that is, if it is found at step S3 that the input data is the special code data, control proceeds to step S9. If the result of checking is NO, that is, if it is found at step S3 that the input data is not the special code data, control proceeds to step S4.

At step S4, input data is directly outputted before control proceeds to step S5.

If it is found at step S2 that the input data is the inhibition code data, then control proceeds to step S6 and the input data is converted at step S6 into ID code data. At the next step S7, special code data is outputted. At the next step S8, the special code data and the ID code data are combined and outputted as combined data. That is, the inhibition code data conversion is carried out in steps S6 to S8. After step S8, control proceeds to step S5.

If the input data is found at step S3 to be the special code data, then control proceeds to step S9 and special code data is outputted at the step S9 and the same special code data is also outputted at the next step S10, so that data consisting of the combination of the two special code data is outputted. Conversion of the special code data is carried out in the steps S9 and S10. After the step S10, control proceeds to step S5.

At the step S5, subsequent to the steps S4, S10, and S8, it is checked whether or not the totality of data have been entered. If the result of checking is NO, that is, if it is found that the data inputting has not been completed, control reverts to step S1. If the result of checking is YES, that is, if it is found that data inputting has been completed, the converting operation comes to an end.

Specifically, if the data is the 8-bit data $00_h$ to $FF_h$, the inhibition code is $FF_h$ and the special code which is not the inhibition code is e.g. $FF_h$ and an ID code which is not the inhibition code nor the special code is e.g. $01_h$, the conversion rule in the method for transmission of the present embodiment is the following.

If, for example, the input code data is the above-mentioned inhibition code $00_h$, the input code data is converted into two-byte data ($FF_h$ $01_h$) consisting of a set of the special code ($FF_h$) and the ID code $01_h$. That is, the input data ($00_h$) is converted into an output data ($FF_h$ $01_h$).

On the other hand, if the input code data is the special code ($FF_h$), the input code data is converted into two-byte data ($FF_h$ $FF_h$) consisting of a set of the special code ($FF_h$) and the special code $FF_h$. That is, the input data (FFh) is converted into an output data ($FF_h$ $FF_h$).

If the input code data is the code data other than the above data, the input code data is transmitted directly.

On the other hand, the inverse conversion rule, associated with the above-mentioned conversion rule, in the transmission method according to the present invention, is the following.

If, for example, the input code data is the special code data ($FF_h$), and the code data next to the special code data (FFh) is the special code ($FF_h$), that is, the two consecutive code data are ($FF_h$ $FF_h$), the input code data is converted into only the 1-byte special code ($FF_h$). After the end of this conversion, the operation of inverse conversion is started as from the code data next to the two consecutive special code data ($FF_h$ $FF_h$).

If the input code data is the special code data ($FF_h$), and the code data next to the special code data ($FF_h$) is the ID code ($01_h$) which is not the special code, that is, the two consecutive code data are ($FF_h$ $01_h$), the input code data is converted into a 1-byte inhibition code. After the end of this conversion, the operation of inverse conversion is started as from the code data next to the two consecutive code data ($FF_h$ $01_h$).

If the input code data is not the special code data ($FF_h$), the input code data is transmitted directly.

Meanwhile, there is only one kind of the inhibition code in the above-described conversion rule and in the inverse conversion rule according to the present invention. If there are plural kinds of the inhibition codes, the conversion and inverse conversion similar to those described above may be carried out by allocating as many kinds of the ID codes as there are the kinds of the inhibition codes.

That is, if there are a plural number N of $0 \sim (N-1)$ of the inhibition codes and the same number N of the association ID codes, where N is less than the total number of codes divided by 2, the conversion rule is the following.

For example, if an input code x is an inhibition code ($x = 0 \sim (N-1)$), and the special code is ($FF_h$) as described above, an output code data following the conversion becomes ($FF_h$(x+N)). On the other hand, it the input code x is not the inhibition code nor the special code, that is, if $x = N \sim FF_h$), an output code following the conversion becomes x. Besides, if the input code x is the special code ($FF_h$), an output code data after conversion becomes ($FF_h$ $FF_h$).

The transmission device or system according to the present invention, to which the above-described transmission method according to the present invention is applied, will now be explained. Note that the transmission device or system according to the present invention may be applied to such case in which a digital recording/playback device, such as a digital VTR, is employed as a data recorder.

That is, the transmission device or system according to the present invention is a transmission device for transmitting the data containing inhibition code data that cannot be recorded by the digital data recording/reproducing device 104. The transmission device is made up of a converting unit 101 for converting at least the inhibition code data into code data consisting of the special code other than the inhibition code and the ID code other than the inhibition code and the special code, that is for converting the inhibition code data into code data not containing the inhibition code and exhibiting redundancy, and an inverse conversion unit 105 for performing a conversion which is a counterpart operation of the conversion by the converting unit 101, as shown in FIG. 2.

The special code and the ID code are at least based on a byte as is the inhibition code. That is, the code data converted by the converting unit 101 is a code data having redundancy with respect to the code data as the object of conversion which is twice or thrice the original data volume.

Figure 2:
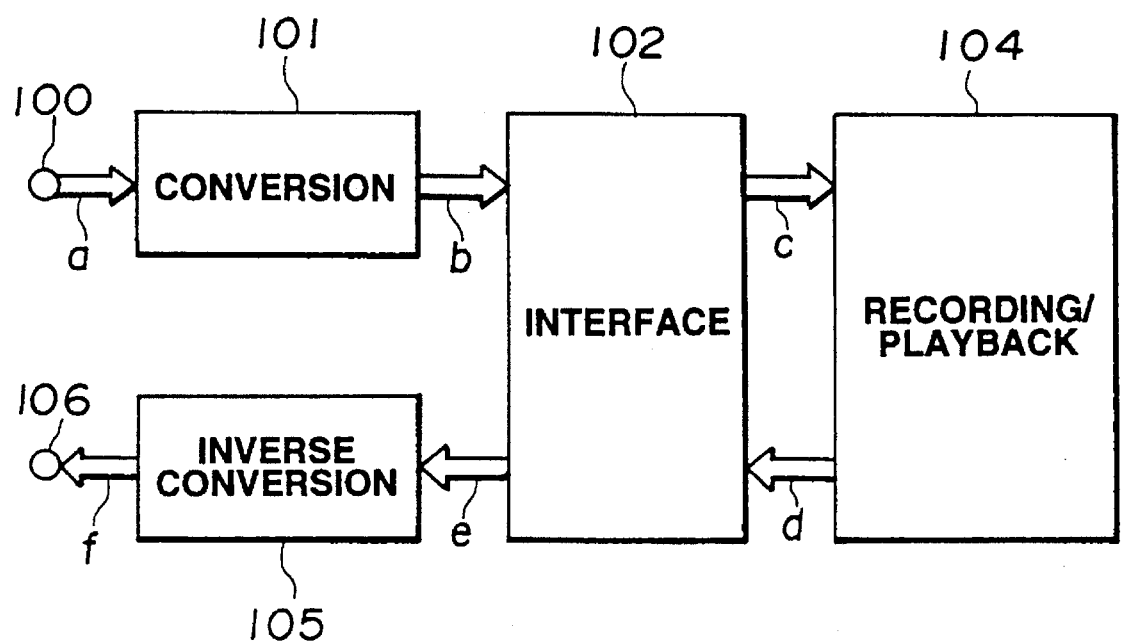
FIG. 2 is a schematic block circuit diagram showing a transmission device for digital data according to the present invention.

Specifically, as shown in FIG. 2, the converting unit 101 of the transmission device of the present invention converts the inhibition code data into code data consisting of the special code data other than the inhibition code data and the ID code data other than the inhibition code data and the special code data, while converting the special code data into the code data consisting of the special code data and the special code data and directly transmitting the code data other than the inhibition code data and the special code data, in accordance with the conversion rule and inverse conversion rule for the above-described converting method. The inverse conversion unit 105 inversely converts the code data consisting of the special code data and the ID code data into the inhibition code data, while converting the code data consisting of the special code data and the special code data, and directly transmitting other code data.

Referring to FIG. 2, digital data a to be recorded by the digital recording/reproducing device 104 are supplied to an input terminal 100. The digital data a are the data containing the totality of code data, that is, data inclusive of the inhibition code data. These digital data a are supplied to the converting unit 101 where they are converted into data b not containing the inhibition code data which obey the above-mentioned conversion rule. Note that the data volume is increased by this conversion by reason of redundancy afforded to the data. The data b are converted by an interfacing unit 102 into input/output format data c for the digital recording/reproducing device 104 so as to enter and be recorded by the digital recording/reproducing device 104.

On the playback side, data d reproduced and outputted by the digital recording/reproducing device 104 are converted by the interfacing unit 102 into data 3 of a format for the downstream side inverse conversion unit 105. The data e are transmitted to the inverse conversion unit 105 where they are inverse converted in accordance with the above-mentioned inverse conversion rule into original data rate digital data f which is outputted at an output terminal 106.

That is, the present transmission device is applied to an apparatus, such as a digital VTR, in which the state of the playback error being the data error is represented by formulating certain code data, that is, the inhibition code data. Since the code data indicating the data error is the inhibition code data on the recording side, it is recorded by conversion of the inhibition code data by code conversion. On the playback side, the data which has not been reproduced correctly is outputted as the inhibition code data.

Thus, if the data is the digital data for which the correction of the data errors remains effective, such as picture or speech, the correction may be performed by the converting unit by taking advantage of the fact that the information of the data errors produced in the digital recording/reproducing device 104 is transmitted to the inverse conversion unit 105 only by the data transmission channel without employing special routes.

Figure 3:
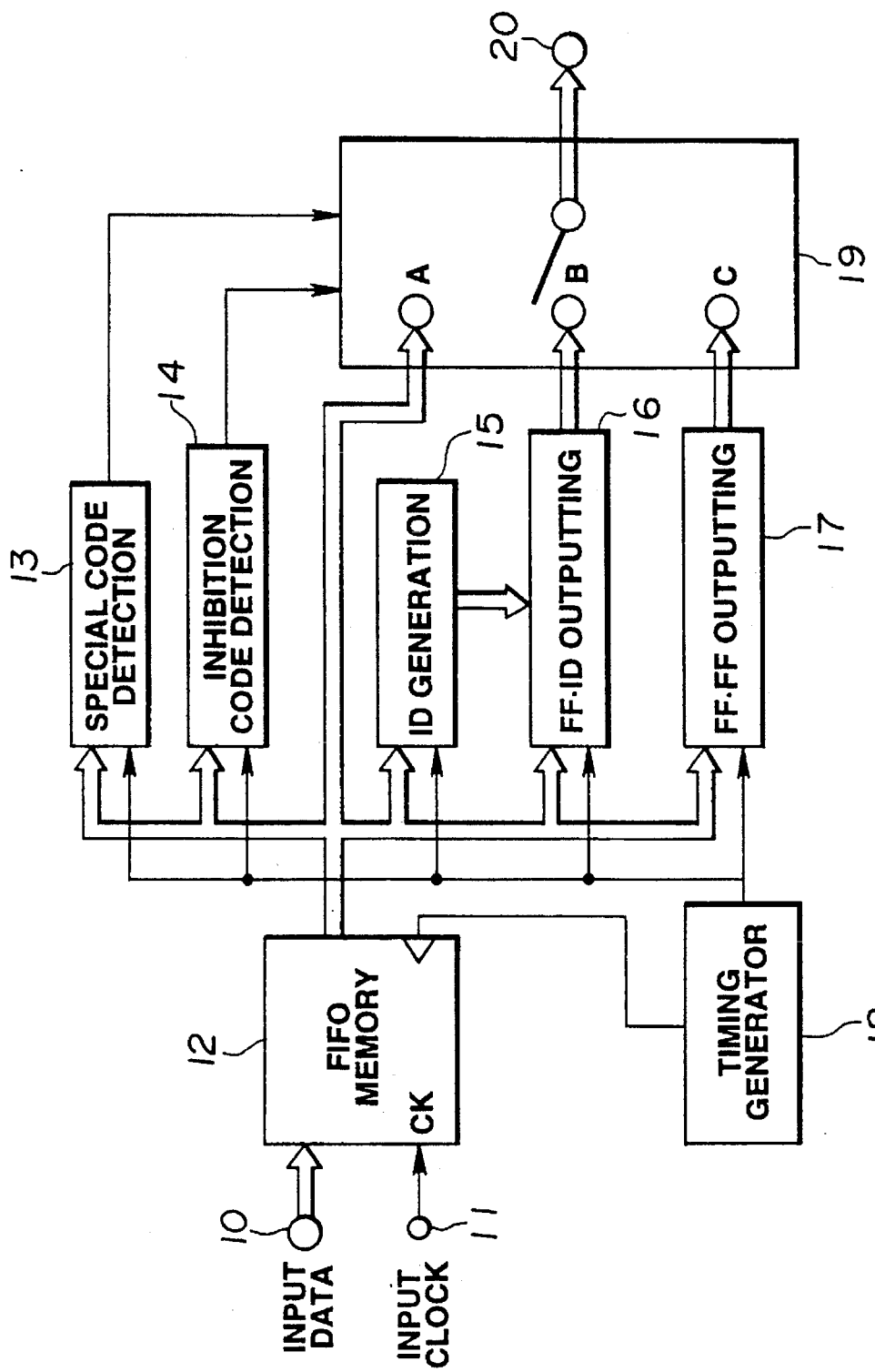
FIG. 3 is a schematic block circuit diagram showing a concrete arrangement of a converting unit of the transmission device for digital data according to the present invention.

The conversion unit 101 shown in FIG. 2 may be implemented by an arrangement shown specifically in FIG. 3.

Referring to FIG. 3, input digital data from a terminal 100 shown in FIG. 2 are supplied to an input terminal 10 and thence supplied to an FIFO memory 12. The input data is written in the FIFO memory 12 based on input clocks, that is, clocks of the input data, supplied to an input terminal 11, so as to be read out with the clocks supplied from a timing clock generator 18 in the order in which they are entered. Meanwhile, the clocks of the timing clock generator 18 are higher in clock rate than the input clocks.

The data read out from the FIFO memory 12 are supplied to a special code detector 13, an inhibition code detector 14, a fixed terminal A of a changeover switch 19, an ID code generator 15, an FF ID output unit 16 and an FF FF output unit 17.

The special code detector 13 detects the special code data from the supplied data, while the inhibition code detector 14 detects the inhibition code from the supplied data. Detection outputs of the special code detector 13 and the inhibition code detector 14 are supplied as changeover control signals to the changeover switch 19.

The ID generator 15 generates the ID code data when the data supplied thereto is the inhibition code data. This ID code data is supplied to the FF ID output unit 16. If the data supplied to the FF ID output unit 16 is the inhibition code data, the FF ID output unit 16 outputs the code data ($FF_h$ $01_h$) consisting of the special code data ($FF_h$) and the ID code data from the ID code generator 15 to supply the code data ($FF_h$ $01_h$) to a fixed terminal B of the changeover switch 19.

If the data supplied to the FF FF output unit 17 is the special code data, the FF FF output unit 17 outputs a code data ($FF_h$ $FF_h$) made up of the above-mentioned special code ($FF_h$) and the special code (FFh) to a fixed terminal C of the changeover switch 19.

Meanwhile, the special code detector 13, inhibition code detection 14, ID code generator 15, FF ID output unit 16 and the FF FF output unit 17 are operated based on clocks supplied from the timing clock generator 18.

The changeover switch 19 is changed over between the fixed terminals A, B and C based on the detection outputs from the special code detector 13 and the inhibition code detector 14. That is, if the special code data is detected by the special code detector 13, the changeover switch 19 is changed over to the fixed terminal C to issue an output of the FF FF output unit 17, that is, a conversion code data of the special code data. On the other hand, if the inhibition code data is detected by the inhibition code detector 14, the changeover switch is changed over to the fixed terminal B to issue an output of the FF ID output unit 16, that is, conversion code data of the inhibition code data, while, if there is no detection output from the special code detection unit 13 or the inhibition code detection unit 14, that is, if the input data is not the special code data nor the inhibition code data, the changeover switch is changed over to the fixed terminal A to directly transmit an output of the FIFO memory 12.

The output of the changeover switch 19 is issued at an output terminal 20 as a conversion output of the conversion unit 101 of the present embodiment so as to be transmitted to the interfacing unit 102 shown in FIG. 2.

Figure 4:
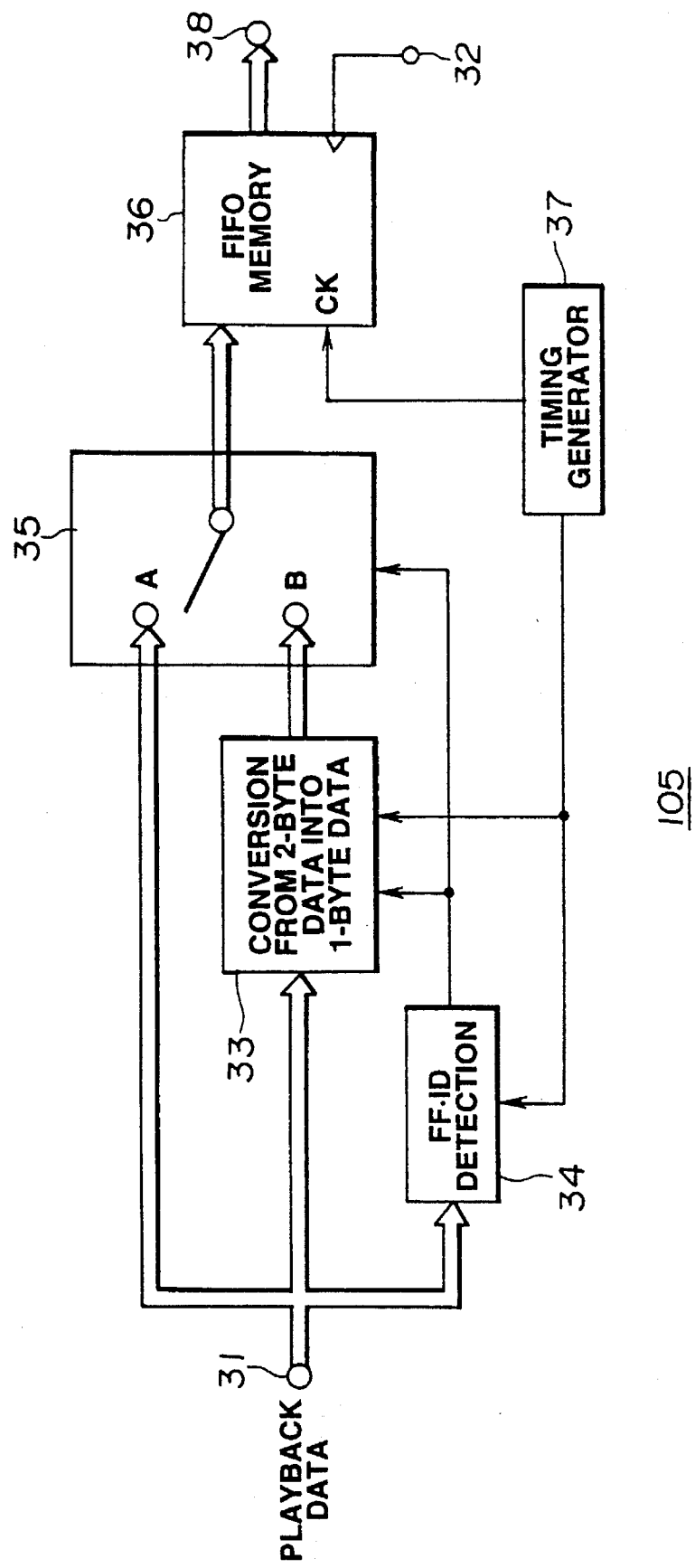
FIG. 4 is a schematic block circuit diagram showing a concrete arrangement of an inverse converting unit of the transmission device for digital data according to the present invention.

The inverse conversion unit 105 of the present embodiment is implemented by an arrangement shown specifically in FIG. 4.

Referring to FIG. 4, playback data from the digital recording/reproducing device 104 are supplied via the interfacing unit 102 to an input terminal 31 and thence supplied to a byte converter 33, a fixed terminal A of a changeover switch 35 and to an FF ID detector 34.

The FF ID detector 34 is operated based on clocks from a timing clock generator 37 adapted for generating clocks similarly to the timing clock generator 18, and is adapted for detecting the code data ($FF_h$ $01_h$) generated on conversion of the inhibition code data from the supplied data by the conversion unit 101.

The byte converter 33 converts the data supplied thereto from two-byte data into one-byte data based on a detection output at the FF ID detection unit 34 and also based on detection of the conversion code data of the special code data ($FF_h$ $FF_h$) by the byte converter 33 itself, while also performing the above-mentioned inverse conversion. That is, if the data supplied to the byte converter 33 is the converted 2-byte conversion code data ($FF_h$ $01_h$), the byte converter 33 converts the data into the 1-byte inhibition code ($00_h$) based on the detection output by the FF ID detector 34. If the data supplied to the byte converter 33 is then converted 2-byte conversion code data ($FF_h$ $FF_h$), the byte converter converts the data into a 1-byte special code data ($FF_h$) based on a detection output of the conversion code data ($FF_h$ $FF_h$) of the special code data detected by the byte converter itself. The output of the byte converter 33 is supplied to a fixed terminal B of the changeover switch 35. Meanwhile, the byte converter 33 is operated based on clocks supplied from the timing clock generator 37.

Figure 5:
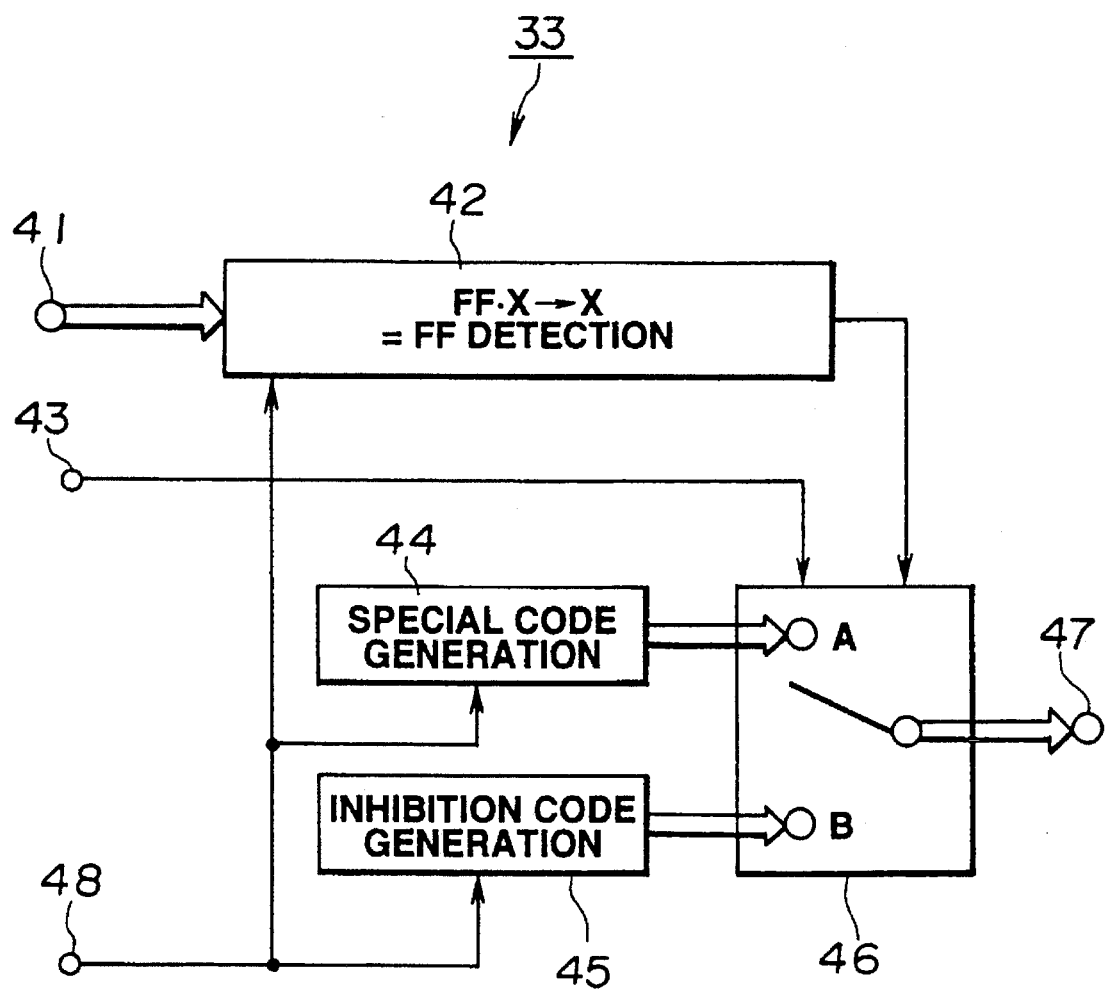
FIG. 5 is a schematic block circuit diagram showing a concrete arrangement of a byte converter of the transmission device for digital data according to the present invention.

The byte converter 33 is constructed as shown specifically in FIG. 5.

In FIG. 5, the byte converter 33 is made up of an FF FF converter 42 for detecting the converted code data of the special code data ($FF_h$ $FF_h$), a special code generator 44 for generating special code data, an inhibition code generator 44 for generating inhibition code data, an inhibition code generator 45 for generating inhibition code data, and a changeover switch 46 having a detection output of the FF FF detector 42 and a detection output of the FF ID detector 34 supplied via a terminal 43 as changeover control signals.

The special code data from the special code generator 44 and the inhibition code data from the inhibition code generator 45 are supplied to the fixed terminals A and B of the changeover switch 46, respectively.

When the detection output of the conversion code of the inhibition code ($FF_h$ $01_h$) from the FF ID detector 34 is supplied via a terminal 43, the changeover switch 46 is set to the side of the fixed terminal B, so that 1-byte inhibition code data from the inhibition code generator 45 is outputted at an output terminal 47 of the byte converter 33. If the conversion code of the special code ($FF_h$ $FF_h$) is detected by the FF FF detector 42, the changeover switch 46 is set to the side of the fixed terminal A, so that a 1-byte special code data from the special code generator 44 is outputted at the output terminal 47 of the byte converter 33.

Meanwhile, the FF FF detector 42, the special code generator 44 and the inhibition code generator 45 are operated based on the clocks from the timing clock generator 37 via a terminal 48.

The data from the output terminal 47 of the byte converter 33 shown in FIG. 5 is supplied to the fixed terminal B of the changeover switch 35 shown in FIG. 4.

Returning to FIG. 4, the changeover switch 35 has a detection output at the FF ID detector 34 as a changeover control signal. If the 2-byte conversion code ($FF_h$ $01_h$) converted from the inhibition code data is detected by the FF ID detector 34, the changeover switch 35 is changed over to the fixed terminal B and is changed over to the fixed terminal A if otherwise.

Consequently, if the data supplied at the terminal 31 is not the above-mentioned inhibition code data nor the conversion code data of the special code, the data is directly outputted from the changeover switch 35. If the data supplied to the terminal 31 is the conversion code data of the inhibition code data, the inhibition code data is outputted, while if the data supplied to the terminal 31 is the conversion code data of the special code data, the special code data is outputted.

The output of the changeover switch 35 is supplied to a FIFO memory 36 in which data supplied thereto are written based on clocks supplied from the timing clock generator 37 and from which the data are read in the sequence in which they are entered to the FIFO memory based on the same clocks as those supplied to the terminal 22 shown in FIG. 3.

The data read from the FIFO memory 36 are outputted at an output terminal 38 of the inverse conversion unit 105 as inverse converted data.

It is seen from above that the digital recording/playback apparatus, such as a digital VTR, in which unrecordable inhibition code data are present as data, may be handled as if these inhibition code data were not present therein so that the digital VTR may be used as a data recorder capable of recording the totality of code data.

It is noted that, if the distribution of the occurrence frequency of the input code data is not flat, the special code data or the ID code data, whichever occurs less frequently with respect to the occurrence frequency distribution of the input data, is selected for possibly preventing the data volume from being increased as a result of conversion. If the code occurrence frequency distribution of input code data is flat, any code data other than the special code data and the inhibition code data may be selected.

The redundant portion in the above-described embodiment represents a minimum recording unit, such as one byte. The transmission method and device according to a modification of the present invention, in which the redundant component or data portion is diminished to make more effective utilization of the recording capacity is hereinafter explained.

In the present embodiment, input digital data is 8-bit data ($00_h$ ~~$FF_h$) and the inhibition code data is $))_h$, as an example, while the special code data other than the inhibition code data is $01_h$ as an example and the ID data is a 2-bit data as an example. The ID data in the present embodiment is such that 2 bits other than the 2 MSB side bits of the inhibition code data are used as the ID data of the inhibition code, that is, the 2 MSB side bits of the inhibition code data≠ID data, while 2 bits other than the 2 MSB side bits of the special code data are used as the ID data of the special code, that is, the 2 MSB side bits of the special code data≠ID data, and the ID data of the inhibition code≠ID data of the inhibition code.

The conversion rule for the transmission method of the present modified embodiment is the following.

If, for example, the input code data is the inhibition code data ($00_h$), a special code ($01_h$) and the 2-bit ID code for the inhibition code data ($00_h$) are combined into a set and 6 MSB side bits of the next input data are appended to the 2-bit ID code data to form the next output data. From this output data on, the conversion is performed on the bit-shifted input data.

If the input code data is the special code data ($01_h$), the special code ($01_h$) and the 2-bit ID code for the special code data ($01_h$) are combined into a set and 6 MSB side bits of the next input data are appended to the 2-bit ID code data to form the next output data. From this output data on, the conversion is performed on the bit-shifted input data.

The input code data other than those mentioned above are transmitted directly.

Figure 6:
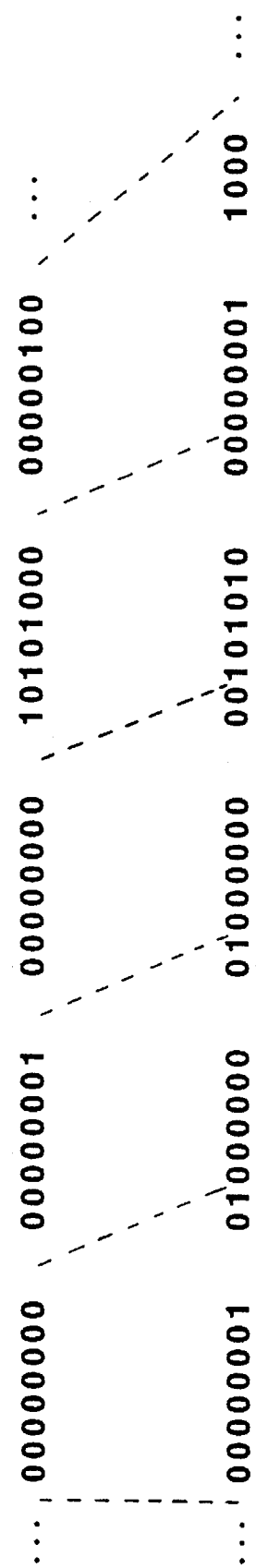
FIG. 6 illustrates the conversion rule according to a modified embodiment of the method for transmitting digital data according to the present invention.

In the present modified embodiment, by selected 2 ID bits other than the 2 MSB side bits of the inhibition code and 2 ID bits other than the 2 MSB side bits of the special code as ID code data, it becomes possible to prevent the continuation of redundancy due to conversion from occurring, as shown for example in FIG. 6.

Thus, it is evident that if the input code data is . . . 00000000 00000001 00000000 10101000 00000100 . . . , it is converted into 00000001 01000000 01000000 00101010 00000001 1000 . . . , in accordance with the conversion rule of the present modified embodiment, as shown in FIG. 6.

On the other hand, the inverse conversion rule for the transmission method of the present modified embodiment, as a counterpart of the above-mentioned conversion rule, is the following.

If, for example, the input code is ($01_h$), it is converted, by way of inverse conversion, into $00_h$ or $01_h$, depending on the state of the next following 2-bit ID. The remaining 6 bits following the ID code data are outputted directly.

If the input code data is not the special code data ($01_h$), it is transmitted directly.

Following the inverse conversion, data are arranged at an ultimate processing stage into a group of 8 bits as a unit which is outputted.

The above-mentioned conversion rule and the inverse conversion rule of the present modified embodiment may be implemented by the conversion device 101 and the inverse conversion device 105 shown in FIG. 2. Specifically, the conversion device 101 and the inverse conversion device 105 for concretely implementing the above-mentioned conversion rule and the inverse conversion rule of the present modified embodiment may be exemplified as shown in FIGS. 7 and 8.

Figure 7:
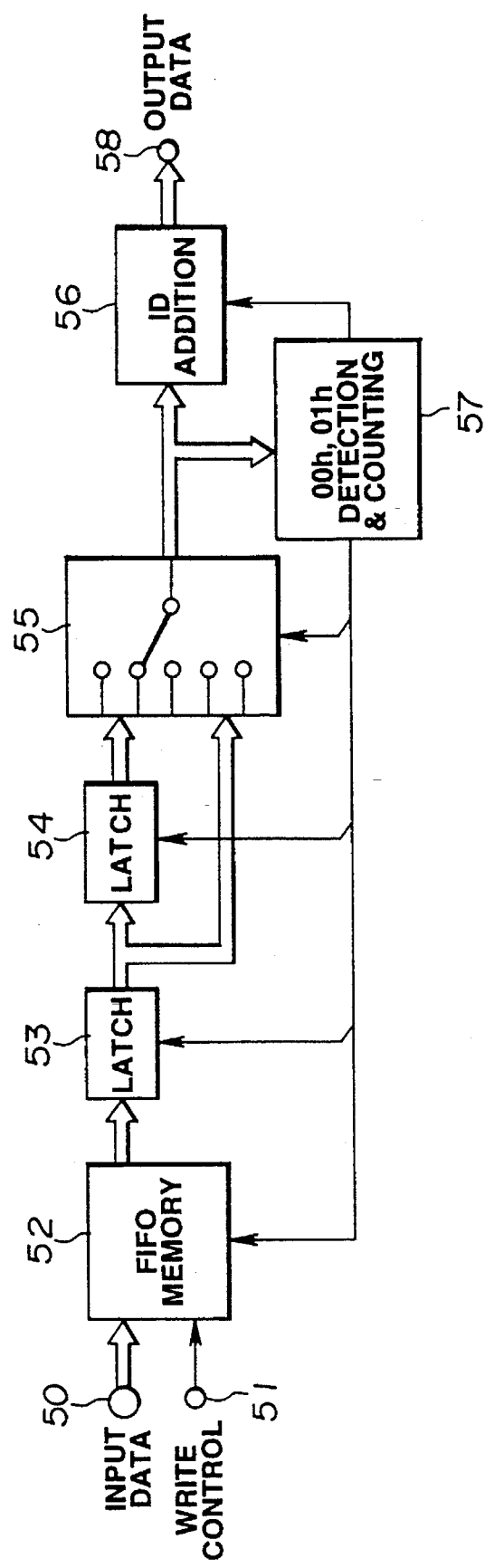
FIG. 7 is a schematic block circuit diagram showing a concrete arrangement of a converting unit of the transmission device for digital data according to a modification of the present invention
Figure 8:
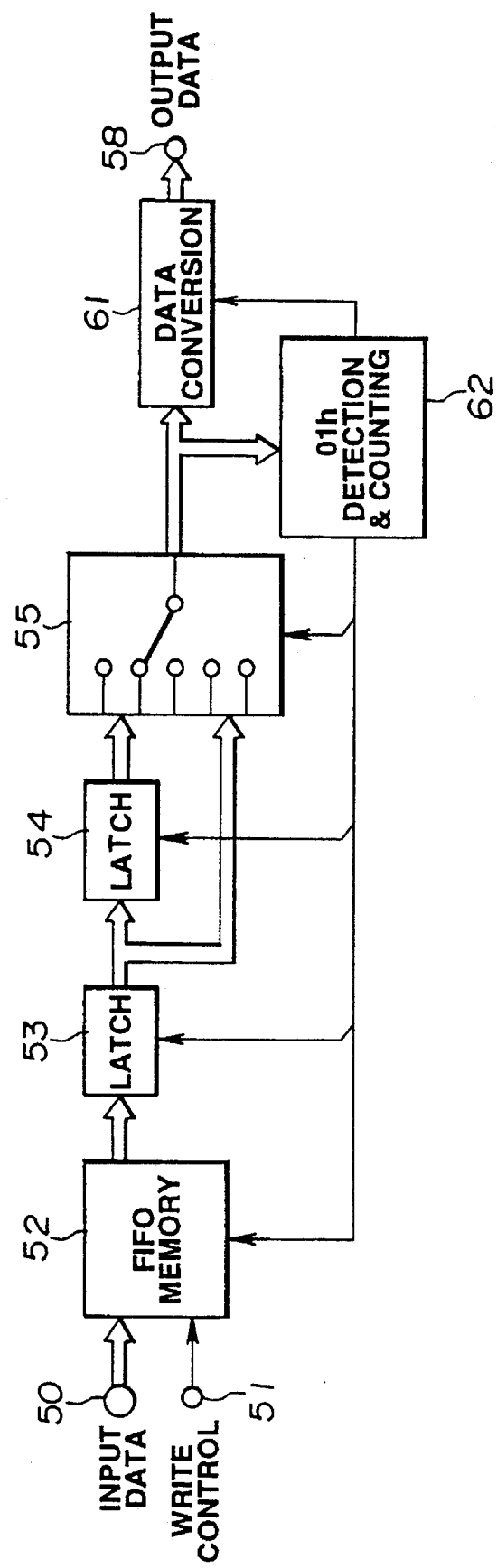
FIG. 8 is a schematic block circuit diagram showing a concrete arrangement of an inverse converting unit of the transmission device for digital data according to a modification of the present invention.

Referring to FIG. 7 showing an arrangement of the conversion device 101 as applied to the present modified embodiment, input digital data are supplied to an input terminal 50 and thence supplied to a FIFO memory 52. The input data is written into the FIFO memory 52 based on write control data supplied at a terminal 51 from a controller, not shown. The data is read out from the FIFO memory 52 based on readout control signals generated by a downstream side controller 57 ($00_h$, 01h detector-counter).

Figure 9:
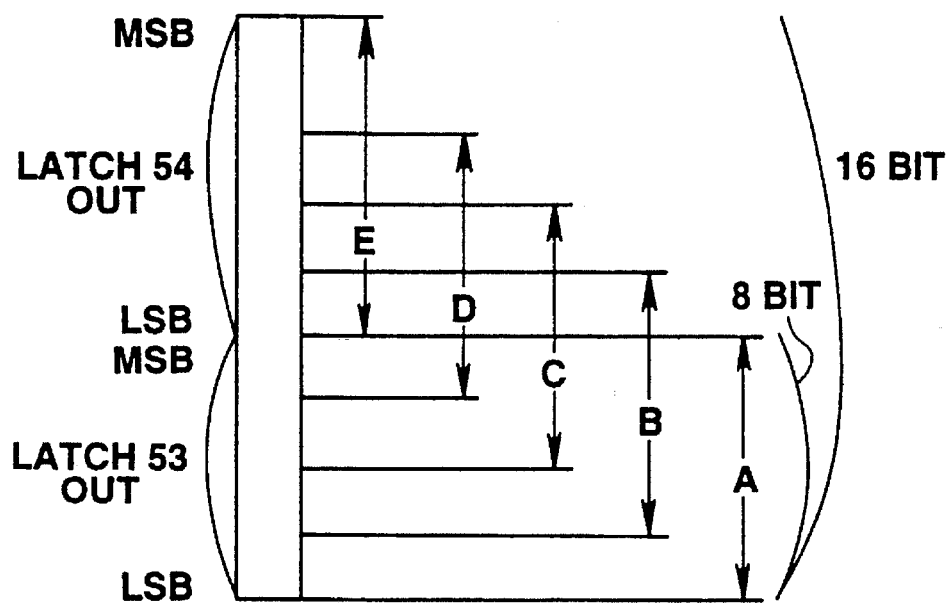
FIG. 9 illustrates the selecting operation by a selector in the converting unit according to the modification shown in FIG. 7.

The data read out from the FIFO memory 52 is re-arranged into data width×2 data by latch control circuits 53, 54, operated based on control signals from the controller 57, as shown in FIG. 9, so as to be supplied to a selector 55.

The data-width data is selected in the selector 55 by selection signals generated by the controller 57.

If the data width is 8 bits and the redundancy is 2 bits, one of the positions A to E is selected at the selector 55 from the outputs of latch circuits 53, 54, as shown for example in FIG. 9.

The data selected by the selector 55 is transmitted to an ID appending circuit 56 and a controller 57. If the controller 57 has detected that the data selected by the selector 55 is $00_h$, that is, the inhibition code or $01_h$, that is, the special code, the information indicating that effect is transmitted from the controller 57 to the ID appending circuit 56. The ID appending circuit 56, which has received the detection information from the controller 57, converts the data supplied thereto into the special code data as mentioned above. In effect, the data 01h remains unchanged. As for the next data, selection at the selector 55 is shifted once, that is, by two bits, to select 6 bits +2 bits of the previous data. The 2 bits of the previous data is changed in the ID appending circuit 56 into ID data which is outputted at an output terminal 58.

Note that in the present embodiment, since the selection operation is moved up to the extreme end position E in FIG. 9 by four selecting operations, the controller 57 causes the reading of the FIFO memory 52 to be skipped once for correcting the contents of the data selector, that is, for reverting to the position A shown in FIG. 9.

The inverse conversion device 105, which is a counterpart of the conversion device 101 of the present modified embodiment shown in FIG. 7, is arranged as shown in FIG. 8, in which the components having the same operation as that of FIG. 7 are denoted by the same reference numerals.

In the present inverse conversion device, the construction from input terminals 50, 51 up to a selector 55 is the same as that of the corresponding portion of FIG. 7. However, data selection is made at the selector 55 by selection signals from a controller 62 ($01_h$ detector and counter) in a manner as shown in FIG. 10.

Figure 10:
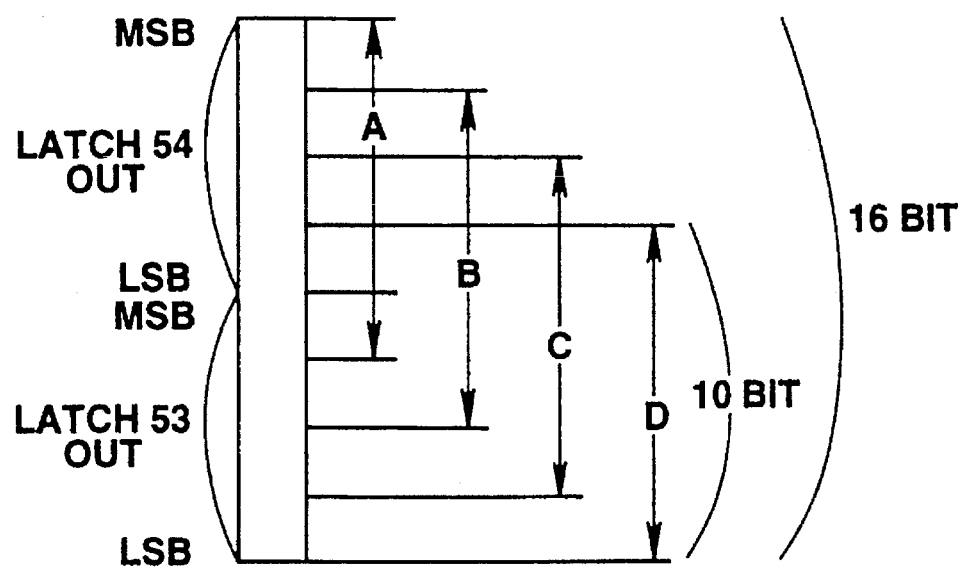
FIG. 10 illustrates the selecting operation by a selector in the inverse converting unit according to the modification shown in FIG. 7.

That is, in distinction to the above-mentioned converting device, the selector 55 of the present inverse conversion circuit outputs data having a width of 10 bits, as shown in FIG. 10. If the controller 62 selects upper 8 bits of an output of the selector 55 as being $01_h$, that is, the special code data, the 10 bits in their entirety are used in a next following data converting circuit 61 for decoding into 8 bit data. That is, the data converting circuit removes the ID data appended to the 10-bit data and converts the remaining data into data of $00_h$ to $01_h$. If the upper 8 bits are not the special code data ($01_d$), the converting circuit directly outputs the upper 8 bits while disregarding the remaining two bits.

On the other hand, the controlling of the FIFO memory 52 and the selector 55 by the controller 62 is the reverse of that in the case of the above-mentioned converting device.

The selection by the selector 55 is shifted once (by one position) on detection of the special code data, as in the above-mentioned converting device. However, the shifting is made in such a manner that the selection is started from the position A in FIG. 10 towards the position D and, as the position D is reached, two more bits are read from the FIFO memory 52 before returning to the position A.

In the above-described modified embodiment, the digital recording device having the inhibition code may be handled as if there were no inhibition code. Besides, the recording capacity may be employed effectively by treating the redundant components on the bit basis.

An embodiment of the present invention in which the above-described embodiments are adapted to the so-called D2 format digital VTR is hereinafter explained.

In the D2 format, inputting of $00_h$ digital video data is inhibited. That is, the data $00_h$ is the inhibition code in the D2 format. Consequently, for recording bit-reduced data with the D2 format digital VTR, it is necessary to transmit the inhibition code data in some other form.

Since there is some allowance in the recording capacity per field in the case of the D2 format, data conversion may be made with redundancy. Consequently, in the D2 format digital VTR, this property is utilized in such a manner that $00_h$ of the inhibition code is converted into other code data with redundancy for removing the inhibition code data $00_h$. Besides, for suppressing the redundancy, the redundant component is 2 bits for each $00_h$ data as in the above-described modified embodiment, and the data are resolved on the bit basis for performing the above-mentioned conversion, so that the inhibition code $00_h$ is not presented when the data is segmented into bytes.

The conversion rule for the D2 format is such that, when the input data is 00000000, for example, it is converted into the 10-bit output data of 0000001 01. If the input data is 00000001, it is converted into the 10-bit output data of 00000001 10. If input data is other than those given above, it is directly outputted as output data, that is, without conversion.

Note that when the input data is converted into 10-bit data as mentioned above, 6 leading bits of the next data is appended as in the above-described modified embodiment to for 2 byte data.

For example, if the input data is . . . 11111110 11111111 00000000 00000001 00000000 10101000 00000100 . . . , it is converted into 11111110 11111111 00000001 01 000000 01000000 00101010 00000001 10 00 . . . .

Besides, if the conversion of removing the above-mentioned inhibition code, that is, $00_h$ encoding, is completed within a recording region, all 1 data are recorded in the remaining gap portion. If overflow is produced in the recording region, the converting operation is terminated when overflow has occurred.

On the other hand, the inverse conversion or decoding, which is the counterpart of the above-mentioned conversion in the D2 format, is the following.

It suffices to perform an operation which is the reverse of the above-described converting operation by way of the inverse conversion for restoring the inhibition code $00_h$. However, a special caution has to be exercised since there is data which was not been able to be corrected, indicated by $00_h$. In addition, an error flag is set in addition to the 8-bit data.

The inverse conversion rule is such that, when input data is 0000000101, for example, it is converted into an output data of 00000000. If the input data is 0000000110, it is converted into an output data of 00000001. If the input data is 00000000, an output data downstream of such byte in the block is all set as an error. If input data is other than those given above, it is directly outputted as output data, that is, without conversion.

What is claimed is:

1. A transmission method for transmitting input code data containing inhibition code data that is not proper to be recorded in a digital recording and/or reproducing apparatus, comprising converting at least the inhibition code data into code data having a redundancy and not containing the inhibition code data according to a conversion rule, and performing an inverse conversion according to an inverse conversion rule which is the reverse of the conversion rule.

2. The transmission method as claimed in claim 1 wherein said special code data and said ID code data are code data having a low frequency of occurrence with respect to the distribution of the occurrence frequency of input code data.

3. The transmission method as claimed in claim 1 wherein said redundancy is selected to be less than twice the code byte length.

4. The transmission method as claimed in claim 3 wherein the redundancy is set so as not to be coincident with any portion of the inhibition code and is a part of the next following data.

5. A transmission device for transmitting input code data containing inhibition code data that is not proper to be recorded in a digital recording and/or reproducing apparatus, comprising converting means for converting at least the inhibition code data into code data consisting of a special code data which is not the inhibition code data and an ID code data which is neither the inhibition code data nor the special code data, and inverse conversion means for performing inverse conversion which is a counterpart operation of the conversion performed by said converting means.

6. The transmission apparatus as claimed in claim 5 wherein at least said special code data and said ID code data are based on a byte in conformity with said inhibition code data.

7. The transmission apparatus as in claim 5 wherein ID code data is less than twice the byte length of the special code data.

8. The transmission apparatus as claimed in claim 7 wherein said ID code is set so as not to be coincident with any portion of said inhibition code and said conversion means causes said ID code data to be a part of the next following data.

* * * * *